(12) United States Patent
Leseman et al.

(10) Patent No.: US 8,679,381 B1
(45) Date of Patent: Mar. 25, 2014

(54) CARBON FIBER FOAM COMPOSITES AND METHODS FOR MAKING THE SAME

(75) Inventors: Zayd Chad Leseman, Edgewood, NM (US); Mark Andrew Atwater, Cary, NC (US); Jonathan Phillips, Pacific Grove, CA (US)

(73) Assignee: STC.UNM, Albuquerque, NM (US)

( * ) Notice: Subject to any disclaimer, the term of this patent is extended or adjusted under 35 U.S.C. 154(b) by 244 days.

(21) Appl. No.: 13/227,413

(22) Filed: Sep. 7, 2011

Related U.S. Application Data (60) Provisional application No. 61/402,911, filed on Sep. 7, 2010, provisional application No. 61/455,168, filed on Oct. 15, 2010.

(51) Int. Cl.
*C01B 31/00* (2006.01)

(52) U.S. Cl.
USPC .................................. 264/29.1; 264/279.1

(58) Field of Classification Search
USPC .............................. 264/29.1, 279.1
See application file for complete search history.

(56) References Cited

U.S. PATENT DOCUMENTS

| | | | | |
|---|---|---|---|---|
| 5,165,909 | A  * | 11/1992 | Tennent et al. | 423/447.3 |
| 8,277,872 | B1 * | 10/2012 | Al-Haik et al. | 427/112 |
| 2005/0170089 | A1 * | 8/2005 | Lashmore et al. | 427/248.1 |
| 2006/0198949 | A1 * | 9/2006 | Phillips et al. | 427/122 |
| 2007/0092431 | A1 * | 4/2007 | Resasco et al. | 423/447.3 |
| 2008/0182108 | A1 * | 7/2008 | Curliss et al. | 428/408 |
| 2008/0248301 | A1 * | 10/2008 | Ting | 428/368 |
| 2009/0263568 | A1 * | 10/2009 | Luhrs et al. | 427/75 |
| 2012/0070667 | A1 * | 3/2012 | Malet et al. | 428/408 |

* cited by examiner

*Primary Examiner* — Matthew Daniels
*Assistant Examiner* — Saeed Huda
(74) *Attorney, Agent, or Firm* — MH2 Technology Law Group, LLP (57) ABSTRACT

Exemplary embodiments provide methods and apparatus of forming fibrous carbon foams (FCFs). In one embodiment, FCFs can be formed by flowing a fuel rich gas mixture over a catalytic material and components to be encapsulated in a mold to form composite carbon fibers, each composite carbon fiber having a carbon phase grown to encapsulate the component in situ. The composite carbon fibers can be intertwined with one another to form FCFs having a geometry according to the mold.

11 Claims, 4 Drawing Sheets

CARBON FIBER FOAM COMPOSITES AND METHODS FOR MAKING THE SAME

RELATED APPLICATIONS

This application claims priority to U.S. Provisional Patent Application Ser. No. 61/402,911, filed Sep. 7, 2010, and Ser. No. 61/455,168, filed Oct. 15, 2010, both of which are incorporated by reference herein in their entirety.

GOVERNMENT RIGHTS

This disclosure was made with Government support under Contract No. PDS 31060 awarded by the National Aeronautical and Space Administration, and Contract No. Q01264 awarded by the National Aeronautic and Space Administration (NASA) via New Mexico State Space Grant Consortium (Federal). The U.S. Government has certain rights in the invention.

BACKGROUND

Carbon foams come in a variety of forms with a range of properties. Conventional methods for generating carbon foams, which require the use of precursor materials, include pyrolysis of polymer foams, use of a sacrificial template, or use of gas evolution in a carbonaceous material such as pitch. The carbon in the foam can range from highly amorphous to highly graphitic depending on the process and conditions under which the foam is created. The properties of the carbon foams are closely catalytic material and the component placed in the mold. The fibrous carbon foam (FCF) can thus be formed to have a geometry corresponding to the predetermined geometry of the internal cavity of the mold, as the composite carbon fibers are continuously formed and intertwined with one another until the mold is full.

According to various embodiments, the present teachings also include a fibrous carbon foam (FCF). The FCF can include a plurality of composite carbon fibers intertwined with one another. Each of the plurality of composite carbon fibers can include a carbon phase encapsulating one or more components that have a melting point temperature of about 750° C. or less. The FCF can have a density ranging from about 0.05 g/cc to about 0.50 g/cc.

It is to be understood that both the foregoing general description and the following detailed description are exemplary and explanatory only and are not restrictive of the present teachings, as claimed.

BRIEF DESCRIPTION OF THE DRAWINGS

The accompanying drawings, which are incorporated in and constitute a part of this specification, illustrate several embodiments of the present teachings and together with the description, serve to explain the principles of the invention.

DESCRIPTION OF THE EMBODIMENTS

Reference will now be made in detail to exemplary embodiments of the present teachings, examples of which are illustrated in the accompanying drawings. Wherever possible, the same reference numbers will be used throughout the drawings to refer to the same or like parts. In the following description, reference is made to the accompanying drawings that form a part thereof, and in which is shown by way of illustration specific exemplary embodiments in which the present teachings may be practiced. These embodiments are described in sufficient detail to enable those skilled in the art to practice the present teachings and it is to be understood that other embodiments may be utilized and that changes may be made without departing from the scope of the present teachings. The following description is, therefore, merely exemplary.

Exemplary embodiments provide methods and apparatus for forming fibrous carbon foams (FCFs). The fibrous carbon foams (FCFs) can be significantly different from conventional types of carbon foams. For example, FCFs can be formed substantially by high aspect ratio composite carbon fibers that provide enhanced mechanical, electrical and thermal properties from conventional types of carbon foams.

As used herein, the term "fibrous carbon foam" or FCF refers to a type of foam composed substantially of composite carbon fibers that are sized in the nano/micro-scale and that are repeatedly intertwined with one another. For example, the composite carbon fibers can have a diameter ranging from about 10 nm to about 1 micron, for example, from about 10 nm to about 500 nm. The composite carbon fiber can include a carbon phase encapsulating desired components having suitable melting point temperatures. The encapsulated components can be used as reinforcing materials for the FCFs. The encapsulated components can be readily added without modifying the foam generation process.

In embodiments, the FCFs can be formed by steps including, but not limited to, first placing a catalytic material and components to be encapsulated together in a mold with an arbitrary geometry; then flowing a fuel rich gas mixture over the catalytic material and the components to be encapsulated to form composite carbon fibers by growing a carbon phase to encapsulate the components in situ, according to the material placement in the mold; and then continuously growing the composite carbon fibers until the mold is full.

In one embodiment, composite carbon fibers can be formed by catalytic decomposition of a hydrocarbon gas contained in the fuel rich gas mixture. The composite carbon fibers can be repeatedly intertwined to form a stable, bulk carbon composite having geometries according to the mold. In embodiments, the process for forming FCFs can be at a low temperature (e.g., of about 750° C. or lower) and/or low pressure (e.g., from around atmospheric pressure to about 10 psi) as compared with conventional carbon foam fabrication processes that often require high temperatures and/or high pressures.

Figure 1A:
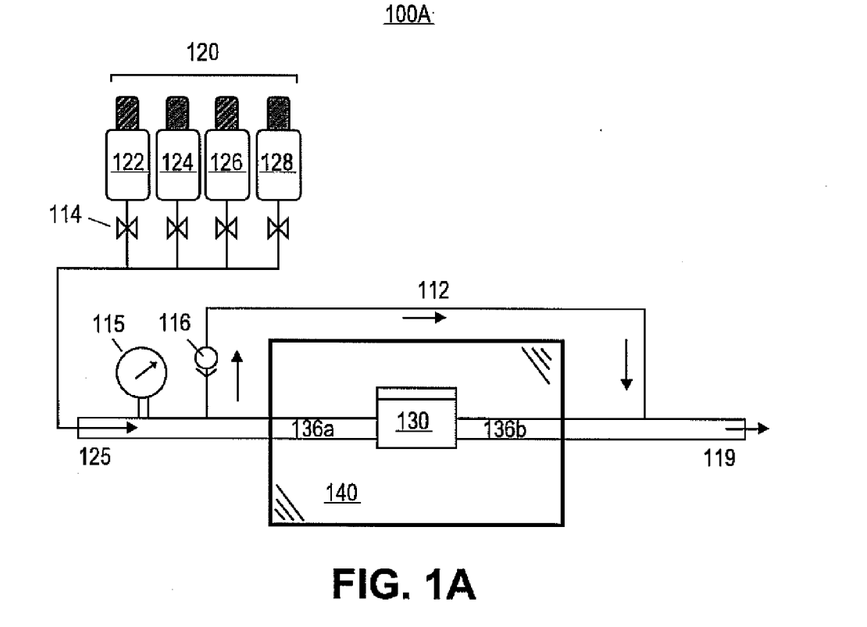
FIG. 1A depicts an exemplary apparatus for forming a fibrous carbon foam (FCF) in accordance with various embodiments of the present teachings.

FIG. 1A depicts an exemplary apparatus 100A for forming FCFs in accordance with various embodiments of the present teachings.

As shown in FIG. 1A, the apparatus 100A can include one or more depositors 120, with each containing a gaseous material for use in the manufacture of a fibrous carbon foam (FCF).

Exemplary gaseous materials can include a carbon source 122, a secondary reactive gas 124, an inert gas 126, and/or other gases 128. For example, a fuel rich gas mixture can be provided by two or more depositors 120 to provide a carbon source 122 such as ethylene ($C_2H_2$) or the like, and a secondary reactive gas 124 such as oxygen ($O_2$) or hydrogen ($H_2$). In some embodiments, the secondary reactive gas 124 can be optional. In one embodiment, the fuel rich gas mixture can include ethylene and oxygen having a molar ratio of 1:1. The inert gas 126 can include, for example, Ar and/or $N_2$. Note that combinations of gaseous materials from the depositors 120 can vary at the discretion of the user and depending upon the environmental conditions in which the apparatus 100A operates as well as the specifications desired for the fibrous carbon foams (FCFs).

The apparatus 100A can also include one or more valves 114 for controlling the timing, volume, and rate at which gaseous materials (see 122, 124, 126, and/or 128) from the depositors 120 are introduced and directed either toward a mold 130 or through a bypass 112 depending upon the position of a pressure relief valve 116. The apparatus 100A can further include a heating mechanism, for example, a furnace 140 within which the mold 130 can be disposed for operation.

In embodiments, any suitable materials that can withstand high temperatures, e.g., of about 800° C. or higher, and inert to the gaseous reaction environment can be used for the mold 130. For example, the mold 130 can be formed of stainless steel, ceramic, plastic, and/or glass. In embodiments, because the mold 130 is smaller than the furnace 140, a ceramic block (not shown) can be used to support the mold in the center of furnace 140 to reduce temperature irregularities.

Figure 1B:
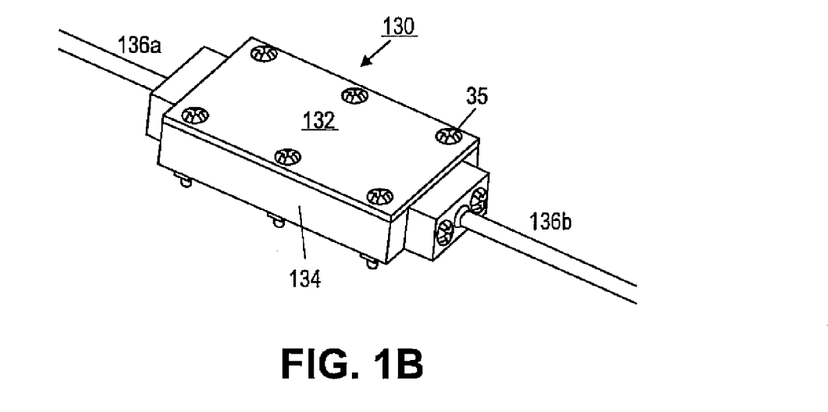
FIG. 1B depicts a perspective view of an exemplary mold usable in an apparatus for forming FCFs in accordance with various embodiments of the present teachings.
Figure 1C:
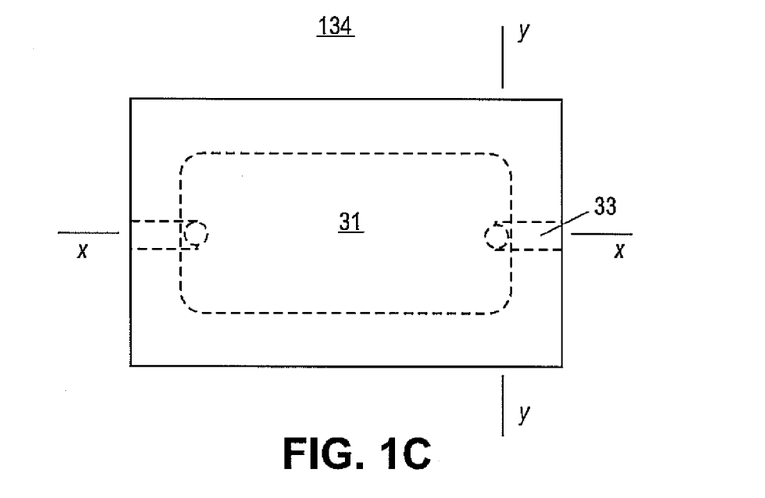
FIGS. 1C-1E depict schematic block diagrams of an exemplary mold in accordance with various embodiments of the present teachings.
Figure 1D:
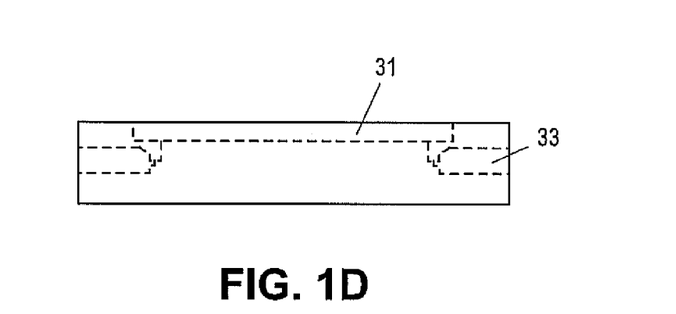
Figure 1E:
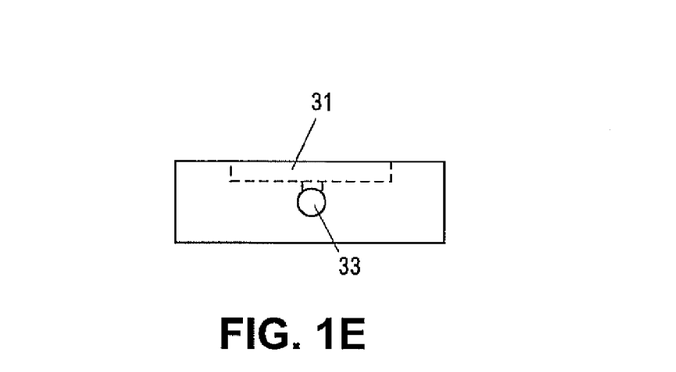

FIG. 1B depicts a perspective view of an exemplary mold 130 that includes, e.g., a lid section 132 and a body section 134. FIGS. 1C-1E depict schematic block diagrams for an exemplary body section 134. Specifically, FIG. 1C depicts a top view of the exemplary body section 134, while FIG. 1D depicts a side view in x-x direction of the body section 134 in FIG. 1C, and FIG. 1E depicts a side view in y-y direction of the body section 134 in FIG. 1C.

For example, the body section 134 in FIGS. 1C-1E can include a cavity 31 machined into a block of the mold material. The cavity 31 can include any predetermined geometries with desired shapes and dimensions for the mold 130. Although the cavity 31 is illustrated as a rectangular parallelepiped in FIGS. 1C-1E, one of ordinary skill in the art will appreciate that the cavity 31 in the body section 134 can encompass any suitable geometries. In one embodiment, the exemplary parallelepiped cavity can have dimensions of approximately 7.5 cm×3.75 cm×0.3 cm.

As shown in FIGS. 1C-1E, on both ends of the body section 134 of the mold 130, holes 33 can be drilled, e.g., in the center of the ends, such that they can intersect the cavity 31. Tubes 136 *a-b* (see FIG. 1A-1B), e.g., formed of stainless steel and/or plastic, can be inserted into the drilled holes 33 and welded or otherwise secured to the body section 134 of the mold 130 to introduce gaseous materials into or flow through the cavity 31. The tubes 136 *a-b* can serve as the inlet plumbing connecting to the gas inlet 125 and the exhaust plumbing connecting the exhaust outlet 119 (see FIG. 1A). The tubes 136 *a-b* can be configured, for example, having an outer diameter of about 0.250" and an inner diameter of about 0.125". In one embodiment, each tube 136 can have equivalent length and can make tubing plus mold longer than the length of the single zone furnace 140 (e.g., about 180 cm or greater). In embodiments, plastic tubing can be hooked to stainless steel tubes of the mold 130 in order to channel gas through the cavity 31.

Referring back to FIG. 1B, in embodiments, the lid section 132 and the body section 134 can be connected by, e.g., stainless steel machine screws fastened by stainless steel nuts 35. The mating surfaces of the body section 134 and lid section 132 can be polished to ensure a tight seal under the conditions employed for the carbon growth. The lid section 132 can be dimensioned to match the mold body section 134. For example, the lid section 132 can be about ⅛" thick and flat on both sides for sealing an exemplary body section 134. Other suitable shapes for the cavity 31 of the mold 130 can include, e.g., prism, cylinder, etc.

The cavity 31 of the mold 130 can be used as a reaction chamber to form composite carbon fibers and FCFs. Referring back to FIG. 1A, gaseous materials can be supplied from the depositors 120 using rotometer valves 114. The pressure relief valve 116 with crack pressure can be placed in line to relieve pressure once the mold becomes blocked with the formed composite carbon fibers. That is, as the pressure within the mold 130 increases, the introduction of gaseous materials from the depositors 120 can be no longer necessary, and thus the pressure relief valve 116 directs any inbound gaseous materials into the bypass 112 for disposition at the outlet 119. The growth conditions of the foams can be determined, at least in part, by the pressure within the mold 130, and thus the parameters of the pressure relief valve 116 can be predetermined in accordance with the desired specifications of the foams.

Figure 2:
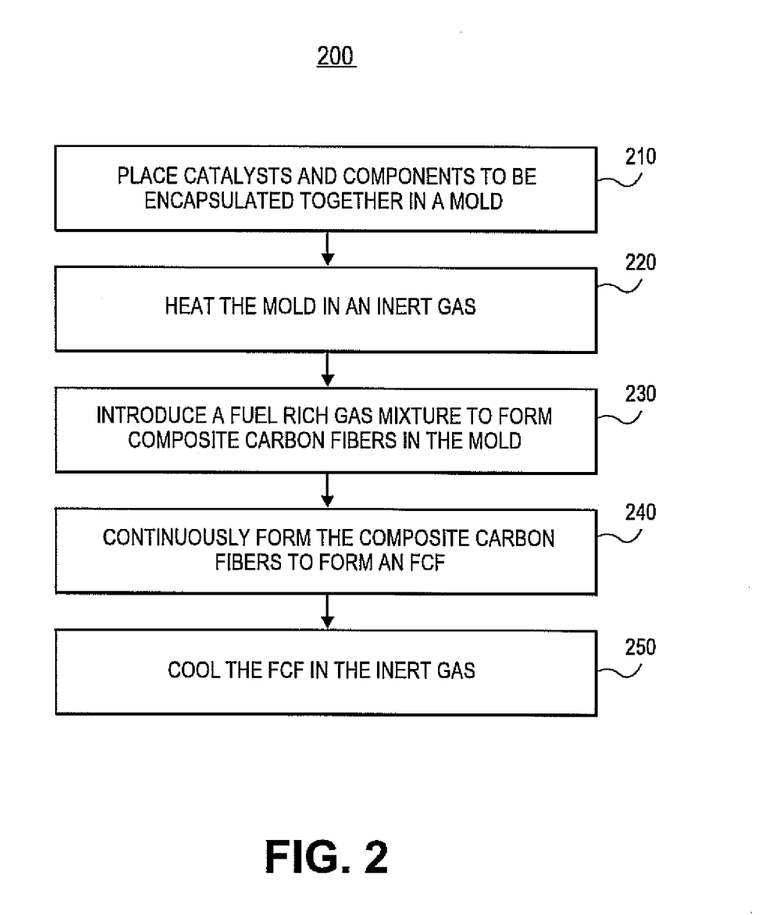
FIG. 2 depicts an exemplary method of forming an FCF in accordance with various embodiments of the present teachings.

FIG. 2 depicts an exemplary method of forming fibrous carbon foams (FCFs), e.g., using the apparatus shown in FIGS. 1A-1E. As shown in FIG. 2, FCFs can be formed by, for example, placing catalytic materials and/or components to be encapsulated into a mold at 210; heating the mold in an inert gas at 220; introducing a fuel rich gas mixture at 230; allowing growth until mold is full at 240; allowing the FCFs to cool to room temperature at 250; etc.

At 210, catalytic materials and/or one or more components to be encapsulated can be placed in the mold 130 at a suitable location and in a suitable orientation such that desired composite carbon fibers can be formed. The placement can be vital to the growth pattern and density control of the resultant FCFs.

For example, the catalytic material can be selected with a view of determining the subsequent steps since each material is sensitive to the reaction temperature and gases. Suitable catalysts can include, are but not limited to, nickel, iron, cobalt, palladium, platinum, alloys of these metals with each other or with other metals such as copper, and catalytic metals with impurities added to affect deposition such as sulfur. The catalytic materials can take the form of particles, films, sheets, etc. In one embodiment, metal catalyst particles in micron scale can be used.

In embodiments, the catalytic materials along with the components to be encapsulated can be placed or deposited at predetermined locations within the internal cavity 31, i.e., the cavity 31 in FIGS. 1C-1E that is closed by the lid section 132 on the body section 134, of the mold 130 in order to control the foam density. Each of the catalytic materials and/or components to be encapsulated can be placed in a manner, e.g., spreading throughout or at least partially on surfaces of the internal cavity such as on a bottom surface of the internal cavity, and/or around the edges/center of the internal cavity of the mold. For example, if the catalysts/components are spread evenly throughout the internal cavity, the density can be less than if they are placed at the edges. In general, the longer it takes for the carbon fibers to fill the internal cavity to block the gas flow, the denser the resultant FCFs can be. Accordingly, by placing the catalysts/components at the edges, the carbon fibers can have more time to fill the height of the internal cavity of the mold before proceeding toward the center and combining to block flow. In one embodiment, the catalysts/components can be distributed in a uniform or variable density in the internal cavity of the mold to prevent or create a density gradient of the resultant foam as desired. In another embodiment, the catalysts/components can be distributed in either solid form or via a liquid medium, or by any other suitable or desirable method or means. For example, using a liquid medium (e.g. ethanol) to carry the catalytic materials/components can provide an ease placement of the catalytic materials/components in the internal cavity of the mold. For example, the catalysts/components can be distributed drop wise to both lid section 132 and bottom section 134 at desired locations within the mold to provide an average density and density gradient of the final product of FCF. In embodiments, the resultant FCF can have an average density in the range between about 0.05 g/cc and about 0.50 g/cc for example between about 0.12 g/cc and about 0.40 g/cc. In other embodiments, the resultant FCF can have a density gradient including a density in the range between about 0.05 g/cc and about 0.50 g/cc for example between about 0.12 g/cc and about 0.40 g/cc.

The amount of catalytic materials/components with respect to the volume or surface area of the internal cavity can also affect the properties of the formed composite carbon fibers, and the resultant foam. For example, by reducing the amount of catalyst used, the density and strength of the resultant foam can be significantly raised, although the more the catalytic materials used, the more quickly the mold can be filled. Also, a reduction in the amount of the catalytic materials can be financially beneficial. Further, the amount of the catalytic materials used can be predetermined during their placement in the mold in order to control the amount of the catalytic materials that will remain in the final product.

In embodiments, the catalytic materials along with the components to be encapsulated can be placed or deposited in an appropriate orientation or arrangement within the internal cavity 31 of the mold 130 in order to form composite carbon fibers. In one embodiment, silica fibers and/or steel foils can be encapsulated within a carbon phase by using Pd catalyst particles to form composite carbon fibers and thus to form FCFs. The materials including Pd catalyst particles, silica fibers, and/or steel foils can be placed in the internal cavity 31 of the mold 130 in a suitable orientation by, e.g., placing a first half amount of the silica fibers and about 60% to about 70% of total amount of Pd particles in a bottom of the internal cavity, placing the steel foils at a center of the internal cavity, and then placing a second half amount of the silica fibers and about 30% to about 40% of total amount of Pd particles over the steel foils. Composite carbon fibers including carbon phase encapsulating both silica fibers and steel foils can then be formed and intertwined with one another to from desired FCFs by subsequent steps as depicted in FIG. 2.

Following placement of the catalytic materials and components to be encapsulated, an inert gas can flow through the mold 130 via the tubes 136. At 220, the temperature of the furnace 140 along with the mold 130 can be raised to a reaction temperature with the inert gas flowing through the mold 130. The reaction temperature can be predetermined based on selections of the catalytic materials and the fuel rich gas mixture, conditions of the internal cavity, etc. In one embodiment, the reaction temperature can be of about 750° C. or less, for example, ranging from about 300° C. to about 750° C., such as about 550° C. The inert gas such as $N_2$ and/or Ar can prevent oxidation or other spoiling of the catalyst materials before introducing the fuel rich gas mixture. In some cases, the catalytic materials can be sintered depending on the specifics of the materials and temperatures involved. In some embodiments, a small amount of carbon or carbon fibers can be formed first at a temperature lower than the reaction temperature to disperse the catalytic materials and/or components to be encapsulated, followed by heating the mold to the reaction temperature.

At 230, at the heated reaction temperature, a fuel rich gas mixture can be added to the flow of inert gas into the mold 130. For example, the fuel rich gas mixture can include a carbon source and/or a secondary gas flowing over the catalytic materials along with the components to be encapsulated that are placed in the internal cavity of the mold 130. The gaseous materials in the fuel rich gas mixture can be introduced to the internal cavity in a ratio appropriate for the catalytic materials and/or the components to be encapsulated and then interact with the catalytic materials. The inert gas such as nitrogen and/or argon can be used to prevent oxidation during this heating process. Composite carbon fibers can then be formed by catalytic decomposition or combustion of the carbon source. Each fiber can have a carbon phase grown to encapsulate the components to be encapsulated, which have been placed together in the mold 130. The growth of carbon phase and the encapsulation of the components can occur in situ according to the placement locations and/or orientations of the catalytic materials and the components in the mold.

In various embodiments, a fast carbon growth can be used for molds with large internal cavity, and a slow growth can be used to alter or improve the foam properties such as density, fiber morphology, and/or mechanical stability. The speed of the fiber growth can be determined by the flow rate, the amount of the catalysts and the gas mixture, etc. The resultant foam properties can be dependent on the composite carbon fibers. In embodiments, the gas combination and the flow rate(s) can be carefully controlled to maintain repeatability of generating FCFs.

At 240, the composite carbon fibers can continue to grow for a time length until the internal cavity of the mold 130 is full, wherein the composite carbon fibers are repeatedly intertwined with one another to form a FCF. The formed FCF can have a specific geometry corresponding to the predetermined geometry of the internal cavity of the mold. For example, when a mold having a rectangular parallelepiped cavity, the resultant foam can be molded to have the same or similar geometry of the rectangular parallelepiped cavity.

Note that once the fibrous carbon foams (FCFs) fill the mold, a restriction to the gas flow of the fuel rich gas mixture can occur. For example, the apparatus 100A can be configured to curtail the growth process in response to indicators such as pressure by triggering the pressure relief valve 116 that the mold is full. In other words, the mold cannot be filled further once the pressure relief valve has been triggered. Other suitable indicators can include temperature, mass, optical or electrical properties; and any appropriate sensors or sensing systems can be employed for determining them.

When the pressure in the mold builds to a pressure equal to or greater than the cracking pressure of the check valve 116, the mold 130 and the furnace 140 can be bypassed and the fuel rich gas mixture can be direct into the exhaust. The inlet pressure of the gases in combination with relief pressure can determine the maximum pressure under which the foam can be grown. In one embodiment, the process can be operable at relatively low pressures, e.g., ranging from atmospheric to about 10 psi and can be completed with a relief pressure of about 1 psi, which is unlike conventional methods having lengthy carbonization steps and/or elevated pressures and temperatures. Additionally, because complex geometries can be accomplished in situ for the FCFs as disclosed herein, no further modification in shape or dimensions is needed to finish the foam product.

At 250, once the mold is full, or after a desired reaction length has been achieved to complete formation process, the fuel rich gas mixture can be replaced with the inert gas and the furnace can be allowed to cool to room temperature. The step of cooling can include using a defined cooling rate. Alternatively, no defined cooling rate needs to be used.

In embodiments, the process depicted in FIG. 2 can yield a mold-filling fibrous carbon foam (FCF) composed of composite carbon fibers tightly wrapped together to produce a material stronger than fibers that are simply laid together. However, various FCFs can be formed by modifying the process of FIG. 2, for example, by modifying reaction parameters including, but not limited to, the location, quantity, and orientation of placing the catalytic materials along with the components to be encapsulated, compositions and flow rates of the fuel rich gas mixture, and/or temperature and time of the heat treatment. FCFs having variable geometries can be formed using relatively low temperatures, around atmospheric pressure, standard laboratory equipment, and/or readily available low cost materials. The resulting FCFs in macro scale shape can include substantially micro and/or nano scale composite carbon fibers, providing multi-scale factor of control.

Figure 3A:
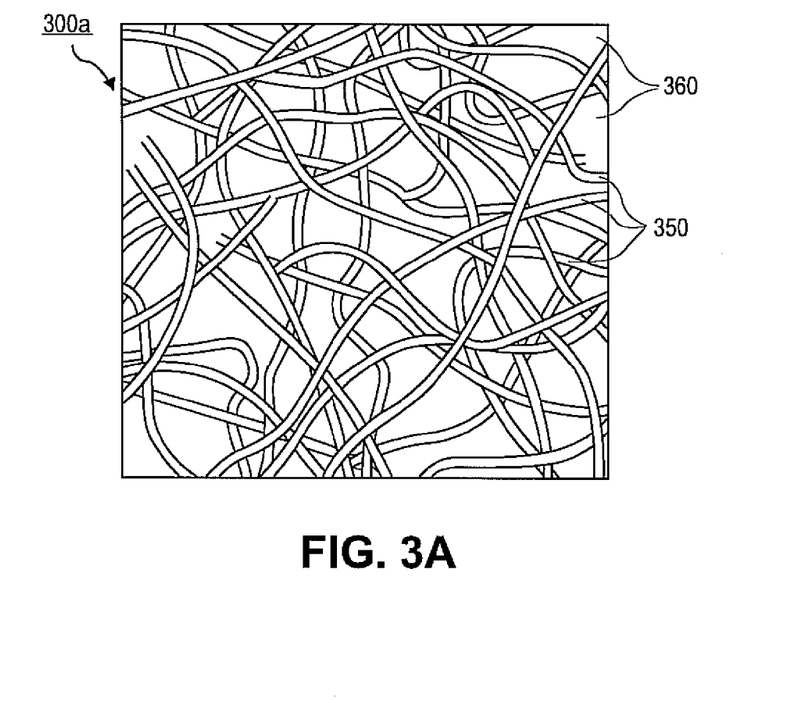
FIG. 3A depicts a portion of an exemplary FCF in accordance with various embodiments of the present teachings.
Figure 3B:
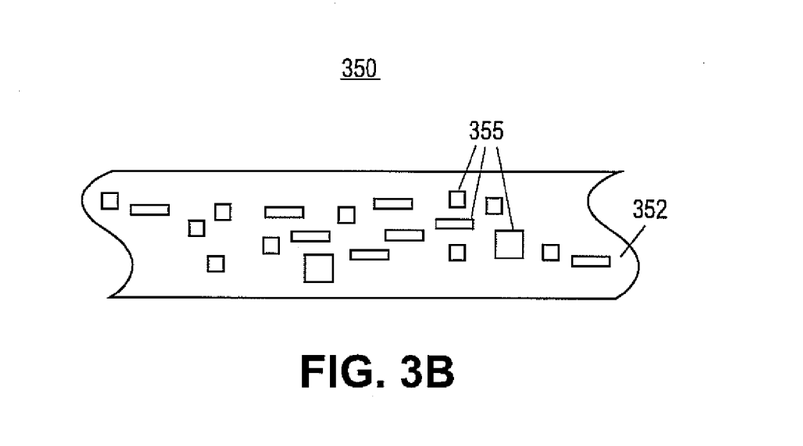
FIG. 3B depicts a portion of an exemplary composite carbon fiber disposed in the FCF of FIG. 3A in accordance with various embodiments of the present teachings.

FIG. 3A depicts a portion of an exemplary fibrous carbon foam (FCF) 300A and FIG. 3B depicts a portion of an exemplary composite carbon fiber in accordance with various embodiments of the present teachings. In one embodiment, the fibrous carbon foam (FCF) 300A can be formed using the apparatus depicted in FIGS. 1A-1E and/or the method depicted in FIG. 2.

In FIG. 3A, the exemplary FCF 300A can include composite carbon fibers 350 intertwined with one another. The intertwined composite carbon fibers 350 can provide a solid volume of about 1% to about 15%, such as about 10% or about 5%, for the FCF, which further includes voids or pores. The FCF 300A can have a geometry governed by the geometry of the internal cavity of the mold (see FIGS. 1C-1E). In embodiments, the disclosed FCFs can be bendable. For example, the FCFs can return to an original form after it is repeatedly bent and deformed into contours and acute angles or even an angle of about 90° or greater. Additionally, the FCFs can return to the originally flattened form without cracking or disintegrating itself. In embodiments, the interior of the FCFs can be consistent with the exterior thereof.

In FIG. 3B, the composite carbon fiber 350 can have an average diameter ranging from about 10 nm to about 1 micron, for example, from about 10 nm to about 500 nm such as about 200 nm. The composite carbon fiber 350 can include a carbon phase 352 surrounding one or more encapsulated components 355. The carbon phase 352 can be amorphous, or graphitic, or partially amorphous and partially graphitic. The encapsulated components 355 can have a melting point temperature less than the reaction temperature as depicted in FIG. 2, for example, of about 750° C. or less or ranging from about 300° C. to about 750° C. The encapsulated components 355 can include, for example, metal, metal oxide, plastic, glass, or combinations thereof. The encapsulated components 355 can take the form of particles, foils, sheets, films, tubes, or combinations thereof. In one example, the encapsulated components 355 can be metal oxides such as silica fibers. In another example, the encapsulated components 355 can be a square of metal foil such as stainless steel.

The encapsulated components 355 can be randomly or uniformly dispersed within the carbon phase 352 of the composite carbon fibers 350. In embodiments, the encapsulated components 355 can be present in an amount ranging from about 1% to about 50% by weight of the total composite carbon fibers 350. For example, the squares of stainless steel foil can be used as encapsulated components having about 1.5 cm on a side and about 0.5 mm thick, wherein the carbon phase is formed to surround the square of stainless steel foil. In embodiments, the formed FCF can have a thickness of about 5 mm or greater. In one embodiment, the carbon phase 352 can have a thickness surrounding the components 355. This thickness can be in the range between 1 nm and about 500 nm such as between 1 nm to about 50 nm or about 10 nm, although it is not limited.

In embodiments, the disclosed FCFs can be lightweight and resilient, possessing desirable mechanical properties. For example, FCFs can be repeatedly compressed in excess of about 40% with substantially no loss in elasticity. Elastic moduli in compression and tension of the FCFs can vary between 1 MPa and 10 MPa depending on its density, with higher densities having higher moduli. In embodiments, the FCFs can be considered as a network of parallel resistors. When under compression, the resistance of the FCFs decreases, and when under tension, the resistance increases.

EXAMPLES

Example 1

Foam Production without Incorporating Encapsulated Components

Carbon foams without incorporating encapsulated components were generated using palladium (Pd) catalysts and a mixture of ethylene and oxygen gases. The catalyst was Pd sub-micron powder (99.9%), purchased from Sigma Aldrich, being placed preferentially at the edges and center of the mold. Pd catalyst was spread thinly over the bottom of a rectangular mold, covering less than about 10% of the mold bottom surface. Loadings of between about 2 mg and about 20 mg of Pd were used. The mold was then heated to about 550° C. in flowing nitrogen (atmospheric pressure). A Lindberg 7" single zone tube furnace was used to heat the mold. Once the desired temperature was reached, a 1:1 mix of ethylene and oxygen (15 sccm each) was added to the flow. Depending on the initial palladium loading, the reaction lasted from about 6 hours to about 19 hours. The time to fill mold was inversely proportional to the amount of catalyst for a single gas mixture. It took about 6 hours for the mold to fill with about 20 mg of catalyst and about 19 hours with about 2 mg of catalyst. Once the process was stopped and the mold had cooled, a carbon foam in the shape of the mold was then removed from the mold.

Example 2

Foam Production including Encapsulated Components

In this example, silica fibers and/or steel foils encapsulated foams were generated using three steps. First, Pd catalyst and all the components to be encapsulated are properly arranged in a mold. In one example, silica fibers and Pd catalyst were placed together in the mold. In another example, about half of the silica fibers and about 60% to about 70% of total amount of the metal catalyst required for fiber growth (e.g., about 5 mg micron scale Pd particles) were placed in the bottom of the mold. The mold was formed by stainless steel having inner dimensions of about 2.5 cm×2.0 cm×0.5 cm. Next, the steel foils (1.5 cm×1.5 cm×0.05 cm) were placed at mold center. A remaining portion of the micron Pd particles of about 30% to about 40% of its total amount and the second half of the silica fibers were placed over the steel foils. The mold was then sealed with six screws around the perimeter. Second, the system was flushed with nitrogen while heating to a reaction temperature of about 550° C. for about one hour. Gas pressure was kept slightly above ambient pressure to force gas out, hence minimizing air leakage into the mold cavity.

Third, a fuel rich mixture of ethylene and oxygen was passed through the mold at about 550° C. This led to growth of composite carbon fibers. In both examples of (1) encapsulating silica fibers only and (2) encapsulating both silica fibers and steel foils, a ratio of 1:1:9 for ethylene: oxygen: nitrogen (15:15:135 sccm) was employed. The inert gas $N_2$ was used to create a non-explosive mix. The composite carbon fibers grew to near chamber capacity in about five hours, increasing the gas pressure, and forcing the gas around the mold via the gas bypass. Time to fill the mold was a function of, e.g., the catalyst employed at a given gas ratio. An inverse relationship existed between the amount of time to fill the mold and the amount of catalyst used—increasing the amount of catalyst reduced the amount of time to fill the mold. Once the bypass was activated, the fuel rich gases were turned off and the system was allowed to cool while continuing to flow nitrogen.

As a result, FCF billets were formed having exemplary densities of about 0.1245 g/cc, 0.2875 g/cc, and 0.3950 g/cc by using Pd catalyst of about 3 mg, 2 mg, and 1.6 mg respectively, and for a time length of about 17 hours, 5 hours, and 16 hours, respectively. This indicates that lower starting weight of catalyst led to forming higher density carbon fiber foams.

While the present teachings have been illustrated with respect to one or more implementations, alterations and/or modifications can be made to the illustrated examples without departing from the spirit and scope of the appended claims. In addition, while a particular feature of the present teachings may have been disclosed with respect to only one of several implementations, such feature may be combined with one or more other features of the other implementations as may be desired and advantageous for any given or particular function. Furthermore, to the extent that the terms "including", "includes", "having", "has", "with", or variants thereof are used in either the detailed description and the claims, such terms are intended to be inclusive in a manner similar to the term "comprising." As used herein, the term "one or more of" with respect to a listing of items such as, for example, A and B, means A alone, B alone, or A and B. The term "at least one of" is used to mean one or more of the listed items can be selected.

Notwithstanding that the numerical ranges and parameters setting forth the broad scope of the present teachings are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5. In certain cases, the numerical values as stated for the parameter can take on negative values. In this case, the example value of range stated as "less than 10" can assume values as defined earlier plus negative values, e.g. −1, −1.2, −1.89, −2, −2.5, −3, −10, −20, −30, etc.

Other embodiments of the present teachings will be apparent to those skilled in the art from consideration of the specification and practice of the present teachings disclosed herein. It is intended that the specification and examples be considered as exemplary only, with a true scope and spirit of the present teachings being indicated by the following claims.

What is claimed is:

1. A method of forming a fibrous carbon foam (FCF) comprising:
    providing a mold comprising an internal cavity, the internal cavity comprising a predetermined geometry;
    placing a catalytic material and a component to be encapsulated in the internal cavity of the mold in an orientation;
    flowing a fuel rich gas mixture comprising a carbon source over the catalytic material and the components to be encapsulated at a reaction temperature of about 750° C. or less to form a plurality of composite carbon fibers, wherein each of the plurality of composite carbon fibers comprises a carbon phase grown to encapsulate the component according to the orientation of the catalytic material and the component placed in the mold; and
    continuously forming the plurality of composite carbon fibers until the mold is full, wherein the plurality of composite carbon fibers are intertwined with one another to form the fibrous carbon foam (FCF) having a geometry corresponding to the predetermined geometry of the internal cavity of the mold.

2. The method of claim 1, further comprising heating the mold to the reaction temperature in the inert gas prior to flowing the fuel rich gas mixture.

3. The method of claim 1, further comprising cooling the FCF or the mold to room temperature in the inert gas.

4. The method of claim 1, further comprising directing the fuel rich gas mixture into a bypass for disposition at an outlet, when the mold is full.

5. The method of claim 1, wherein the plurality of composite carbon fibers are formed at about one atmospheric pressure to about 10 psi.

6. The method of claim 1, wherein each of the catalytic material and the component is placed by at least partially spreading on a surface of the internal cavity of the mold, at edges of the internal cavity, in a center of the internal cavity, or combinations thereof.

7. The method of claim 1, wherein the carbon source comprising hydrocarbon, and wherein the fuel rich gas mixture further comprises a secondary reactive gas comprising oxygen or hydrogen.

8. The method of claim 7, wherein the fuel rich gas mixture comprises ethylene and oxygen having a molar ratio of 1:1.

9. The method of claim 1, further comprising dispersing the catalytic material or the component at a temperature lower than the reaction temperature prior to forming the plurality of composite carbon fibers at the reaction temperature.

10. The method of claim 1, wherein the catalytic material comprises Pd particles and the component to be encapsulated comprises silica fibers, steel foils, or a mixture thereof.

11. The method of claim 10, wherein the step of placing a catalytic material and a component to be encapsulated in the mold in an orientation further comprises,
    placing a first half amount of the silica fibers and about 60% to about 70% of a total amount of Pd particles in a bottom of the internal cavity of the mold,
    placing the steel foils at a center of the internal cavity, and placing a second half amount of the silica fibers and about 30% to about 40% of the total amount of Pd particles over the steel foils.

* * * * *